United States Patent
Yanagida et al.

(10) Patent No.: US 7,307,519 B2
(45) Date of Patent: Dec. 11, 2007

(54) COMMUNICATION SYSTEM AND PLC NETWORK

(75) Inventors: Yo Yanagida, Susono (JP); Naoyuki Shiraishi, Susono (JP); Atsushi Kawamura, Susono (JP); Terumitsu Sugimoto, Susono (JP)

(73) Assignee: Yazaki Corporation, Tokyo (JP)

( * ) Notice: Subject to any disclaimer, the term of this patent is extended or adjusted under 35 U.S.C. 154(b) by 196 days.

(21) Appl. No.: 11/178,289

(22) Filed: Jul. 12, 2005

(65) Prior Publication Data
US 2007/0013492 A1    Jan. 18, 2007

(51) Int. Cl.
*H04Q 1/30* (2006.01)

(52) U.S. Cl. .............. 340/538; 340/310.11; 701/36

(58) Field of Classification Search ........... 340/538, 340/310.11, 310.13, 531; 701/36
See application file for complete search history.

(56) References Cited

U.S. PATENT DOCUMENTS 5,745,027 A * 4/1998 Malville ............... 375/259
6,229,434 B1 * 5/2001 Knapp et al. .......... 340/310.16
6,842,108 B2 * 1/2005 Akiyama et al. ...... 340/310.11
7,176,585 B2 * 2/2007 Fehr ..................... 307/9.1

FOREIGN PATENT DOCUMENTS

| GB | 2 348 349 A | 9/2000 |
| JP | 2001-358618 A | 12/2001 |
| JP | 2003-118509 A | 4/2003 |

* cited by examiner

Primary Examiner—Phung T. Nguyen
(74) Attorney, Agent, or Firm—Sughrue Mion Pllc.

(57) ABSTRACT

A communication system includes a main power line and a plurality of PLC networks connected to the main power line in common. At least one of the PLC networks includes a plurality of nodes. One node of the nodes in the PLC network is connected to the main power line. The other nodes are interconnected via a sub power line so as to receive power from the main power line through the one node. An inductor provided in the one node is connected to the main power line and the sub power line.

11 Claims, 4 Drawing Sheets

COMMUNICATION SYSTEM AND PLC NETWORK

BACKGROUND OF THE INVENTION

The present invention relates to a vehicle information communication technology including a vehicle-mounted equipment control technology using PLC (Power Line Communication) for transmitting a control signal as well as power by using a power line for feeding power to a load.

Power line communication (hereinafter referred to as PLC) is used as a communication method for controlling various types of electrical equipment mounted on an automobile such as a power window and a wiper.

FIG. 3 is a conceptual illustration showing a configuration of a vehicle-mounted equipment control system using PLC as an example of a vehicle information communication system. The system shown in FIG. 3 supplies power from a battery (not shown) to a plurality of loads 73 including electrical equipment, and a master controller 74 (hereinafter referred to simply as a master) and a slave controller 75 (hereinafter referred to simply as a slave) for controlling these loads via a junction connector (J/C) 72 connected to a power line 71. The slave 75 is a controller provided for each load 73 while the master 74 is a controller for controlling the loads 73 via the slaves 75. In this system, the master 74 transmits a communication signal M to the slave 75 as a distant party via a power line (a power line in the PLC network is hereinafter referred to as a sub power line) 77 in a PLC network 76 interconnected by the junction connector 72. The slave 75 receives the communication signal M via the sub power line 77 and transmits, via the sub power line 77, a communication signal S indicating the state of the load 73 controlled by the slave 75. The master 74 transmits a communication signal M corresponding to the communication signal S received from the slave 75. The master 74 and each slave 75 control the respective loads 72 while communicating with each other via the sub power line 76 (refer to JP-A-2003-118509).

A vehicle-mounted equipment control system using PLC is capable of performing proper control operation in case the PLC network exists alone as shown in FIG. 3, because communication between the master and the slaves are kept stable. In case two PLC networks 89, 90 are adjacent to each other via the main power line 71 as shown in FIG. 4, interference between the PLC networks 80, 90 may cause improper control operation. In the example of FIG. 4, a communication signal SigA communicated between the master 83 and the slave 84 in the PLC network 80 invades, via the main power line 71, the PLC network 90 that is adjacent to the PLC network 80, thus interfering with the communication in the PLC network 90. Conversely, a communication signal SigB in the PLC network 90 invades the PLC network 80 via the main power line 71, thus interfering with the communication in the PLC network 80.

In order to solve such a problem, a related art technology inserts an inductor into a main power line between PLC networks coupled to a pole-mounted transformer for feeding power to a home or office in order to prevent interference between PLC networks (refer to JP-A-2001-358618).

By applying the related art to the vehicle-mounted equipment control system shown in FIG. 3, that is, by additionally inserting an inductor into the main power line 71 or sub power line connecting the PLC networks 80 and 90, it is possible to interrupt an interference-causing signal over the main power line 71. In a system that performs driving control of equipment mounted on a vehicle, it is difficult to reserve a space for inserting an inductor. Moreover, an additional inductor results in a higher cost. Thus, the approach is not impractical.

SUMMARY OF THE INVENTION

The invention has been accomplished in view of the above circumstances and has as an object to provide a vehicle information communication system using PLC capable of preventing interference between PLC networks connected to a common main power line without additionally inserting an inductor into the main power line.

In order to attain the object, the invention provides a communication system, comprising:
a main power line; and
a plurality of PLC networks connected to the main power line in common,
wherein at least one of the PLC networks includes a plurality of nodes
wherein one node of the nodes in the PLC network is connected to the main power line;
wherein the other nodes are interconnected via a sub power line so as to receive power from the main power line through the one node; and
wherein the one node has an inductor that is connected to the main power line and the sub power line.

Preferably, a circuit for reserving impedance in the one node serves as the inductor.

Preferably, the other nodes are sub controllers that are respectively connected to loads. The one node is a master controller that controls the loads through the sub controllers.

According to the present invention, there is also provided a PLC network, comprising:
a plurality of nodes,
wherein one node of the nodes is connected to a main power line, the main power line being connected to other PLC network in common;
wherein the other nodes are interconnected via a sub power line so as to receive power from the main power line through the one node; and
wherein the one node has an inductor that is connected to the main power line and the sub power line.

Preferably, a circuit for reserving impedance in the one node serves as the inductor.

Preferably, the other nodes are sub controllers that are respectively connected to loads. The one node is a master controller that controls the loads through the sub controllers.

With the configurations, a signal leaving the PLC network, that is, a signal leaking into the main power line must pass through the inductor in the one node so that the leaked signal is attenuated. Similarly, a signal invading the PLC network from another PLC network via the main power line must pass through the inductor in the one node thus the invaded signal is attenuated. Therefore, it is possible to prevent interference between PLC networks connected to a common main power line without additionally inserting an inductor into the main power line.

In the communication system according to the invention, an existing circuit for reserving impedance in the one node such as an LC resonator circuit may be used as the inductor.

The communication system according to the invention uses an existing inductor in a node in a PLC network to prevent interference between PLC networks connected to a common main power line. This eliminates the need fir additionally inserting an inductor for attenuating a signal into a main power line. It is thus possible to provide, readily and cost-effectively, a system capable of precisely controlling vehicle-mounted equipment without malfunction caused by interference between PLC networks.

The invention has been briefly described. Details of the invention will be further clarified by reading the following description of the best embodiments for implementing the invention while referring to the attached drawings.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Best embodiments for implementing the invention will be described below.

Figure 1A:
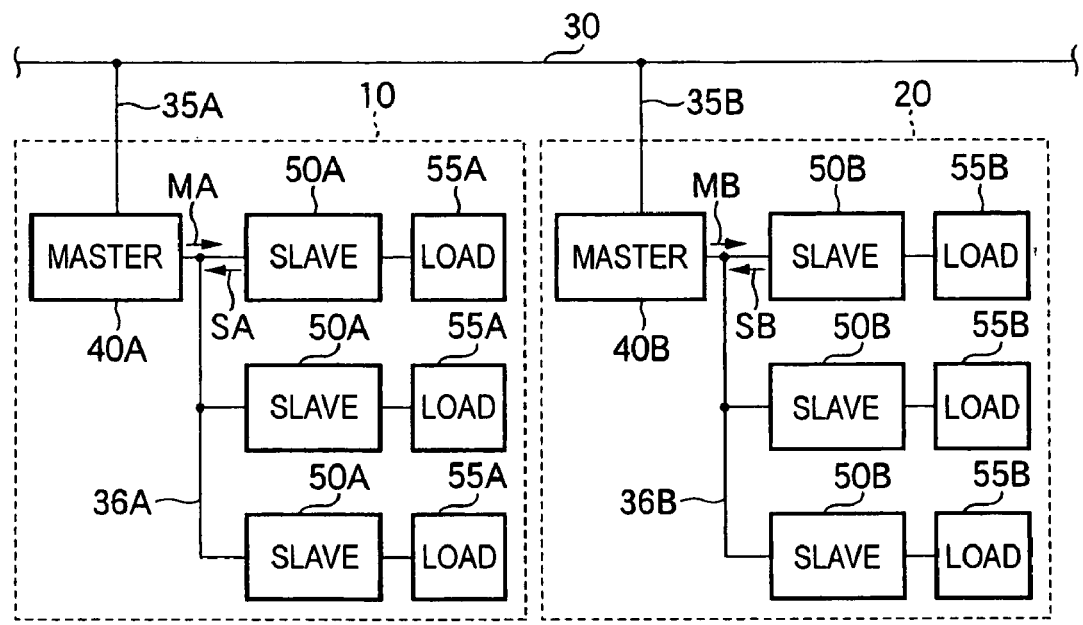
FIG. 1A is a conceptual illustration showing a vehicle-mounted equipment control system as an example of a vehicle information communication system according to a first embodiment of the invention.

FIG. 1A is a conceptual illustration showing a vehicle-mounted equipment control system as an example of a vehicle information communication system according to a first embodiment of the invention. In FIG. 1, numerals 10, 20 represent PLC networks. These networks are in such close proximity to each other as to cause serious interference. The PLC networks 10, 20 are respectively connected to a main power line 30 for transmitting power from a battery (not shown).

The PLC networks 10, 20 respectively have four nodes; that is, one master 40 (40A, 40B) and three slaves 50 (50A, 50B). The master 40 of each PLC network 10, 20 is connected to the main power line 30 via a wire harness 35 (35A, 35B). The master 40 also functions as a junction connector. The master 40 and the slaves 50 in each PLC network 10, 20 are interconnected via a sub power line 36 (36A, 36B) so as to feed power from the main power line 30 to the slaves 50 via the master 40. The slave 50 is a controller provided for each load 55 (55A, 55B) while the master 40 is a controller for controlling each load 55 via each slave 50.

Figure 1B:
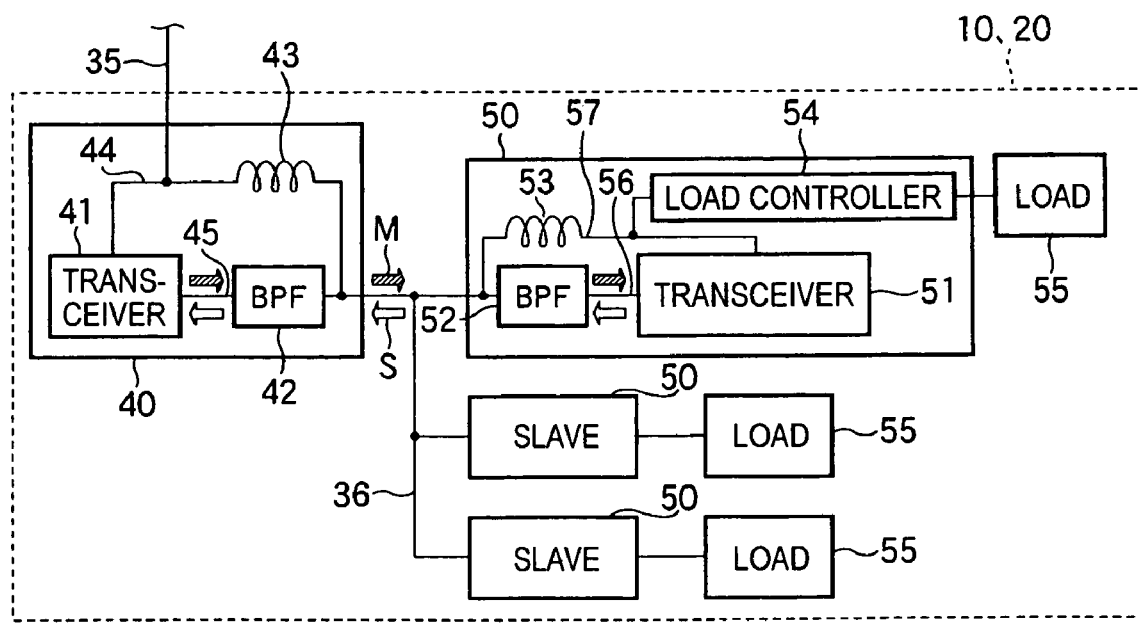
FIG. 1B is a conceptual illustration showing an example of a PLC network.

FIG. 1B shows the internal configuration of the master 40 and the slave 50.

The master 40 has a transceiver 41, a band-pass filter (BPF) 42, and an inductor 43 for reserving impedance. The transceiver 41 and the band-pass filter 42 are connected via a signal line 45. The band-pass filter 42 is connected to a sub power line 36 and transmits only a communication signal in a predetermined band superimposed over the sub power line 36. The transceiver 41 communicates with each slave 50 while using the sub power line 36 as a signal transmission line through the band-pass filter 42. The inductor 43 for reserving impedance is inserted midway in a power line 44 connecting the transceiver 41 and the main power line 30. A wire harness 35 is connected between the inductor 43 for reserving impedance and the transceiver 41. Power transmitted from the main power line 30 via the wire harness 35 is fed to the transceiver 41 in the master 40 as well as fed to each slave 50 via the inductor 43 for reserving impedance and in the master 40 and the sub power line 36.

Each slave 50 has a transceiver 51, a band pass filter 52, an inductor 53 for reserving impedance, and a load controller 54. The transceiver 51 and the band-pass filter 52 are interconnected via a signal line 56. The band-pass filter 52 is connected to a sub power line 36 and transmits only communication signals M (MA, MB) and S(SA, SB) in a predetermined band superimposed over the sub power line 36. The transceiver 51 communicates with the master 40 while using the sub power line 36 as a signal transmission line through the band-pass filter 52. The inductor 53 for reserving impedance is inserted midway in a power line 57 connecting the transceiver 51 and the sub power line 36. Power transmitted to the slave 50 via the sub power line 36 is fed to the transceiver 51 via the inductor 53 for reserving impedance. The load controller 54 receives a communication signal M from the master 40 via the transceiver 51 and controls the load 55 in accordance with the communication signal M as well as transmits a communication signal S corresponding to the state of the load 55 to the master 40 via the transceiver 51.

PLC operation of the vehicle-mounted equipment thus configured is as follows.

The master 40A in the first PLC network 10 transmits a communication signal MA to the slave 50A as a distant party via the sub power line 36A in the first PLC network 10. The slave 50A, receiving the communication signal MA from the master 40A, transmits a communication signal SA indicating the state of the load 55A controlled by the slave 50A to the master 40A via the sub power line 36A in the first PLC network 10. The master 40A transmits the communication signal MA corresponding to the communication signal SA received from the slave 50A. In this way, the master 40A and each slave 50A in the first PLC network 10 control the respective loads 55A while communicating with each other via the sub power line 36A in the first PLC network 10.

The master 40B in the second PLC network 20 transmits a communication signal MB to the slave 50B as a distant party via the sub power line 36B in the second PLC network 20. The slave 50B, receiving the communication signal MB from the master 40B, transmits a communication signal SB indicating the state of the load 55B controlled by the slave 50B to the master 40B via the sub power line 36B in the second PLC network 20. The master 40B transmits the communication signal MB corresponding to the communication signal SB received from the slave 50B. In this way, the master 40B and each slave 50B in the second PLC network 20 control the respective loads 55B while communicating with each other via the sub power line 36B in the second PLC network 20.

While each PLC network 10, 20 is performing PLC-based master-slave communication, part of a communication signal communicated in each PLC network 10, 20 leaks into the main power line 30. The signal leaking into the main power line 30 from each PLC network 10, 20 must pass through the inductor 43 for reserving impedance in the master 40 so that the leaked signal is attenuated. Similarly, a signal invading the PLC network 10, 20 from outside must pass through the inductor 43 for reserving impedance so that the invaded signal is attenuated. As a result, interference between the PLC networks 10 and 20 is prevented.

As mentioned above, the vehicle-mounted equipment control system according to the first embodiment uses the existing inductor 43 in the master 40 that is a node in the PLC network 10, 20 as an inductor for attenuating a signal in order to, prevent interference between the PLC networks 10 and 20. With this system configuration, it is not necessary to additionally insert an inductor for attenuating a signal into the main power line 30. It is thus possible to provide, readily and cost-effectively, a system capable of precisely controlling vehicle-mounted equipment without malfunction caused by interference between the PLC networks 10 and 20.

Figure 2:
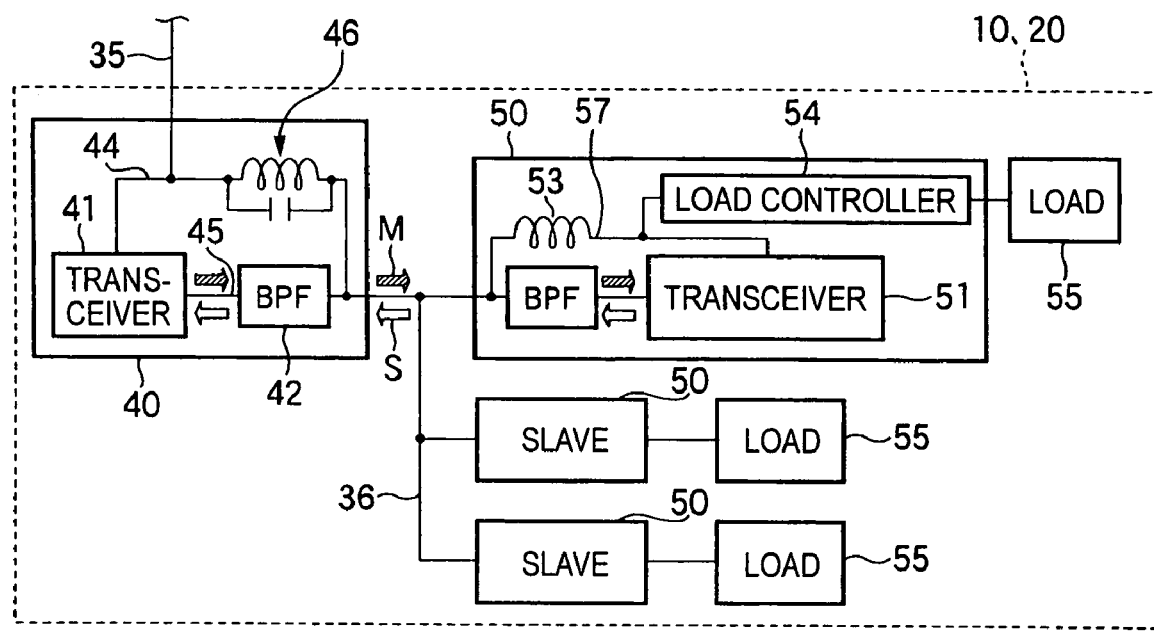
FIG. 2 is a conceptual illustration showing a vehicle-mounted equipment control system according to a second embodiment of the invention.
Figure 3:
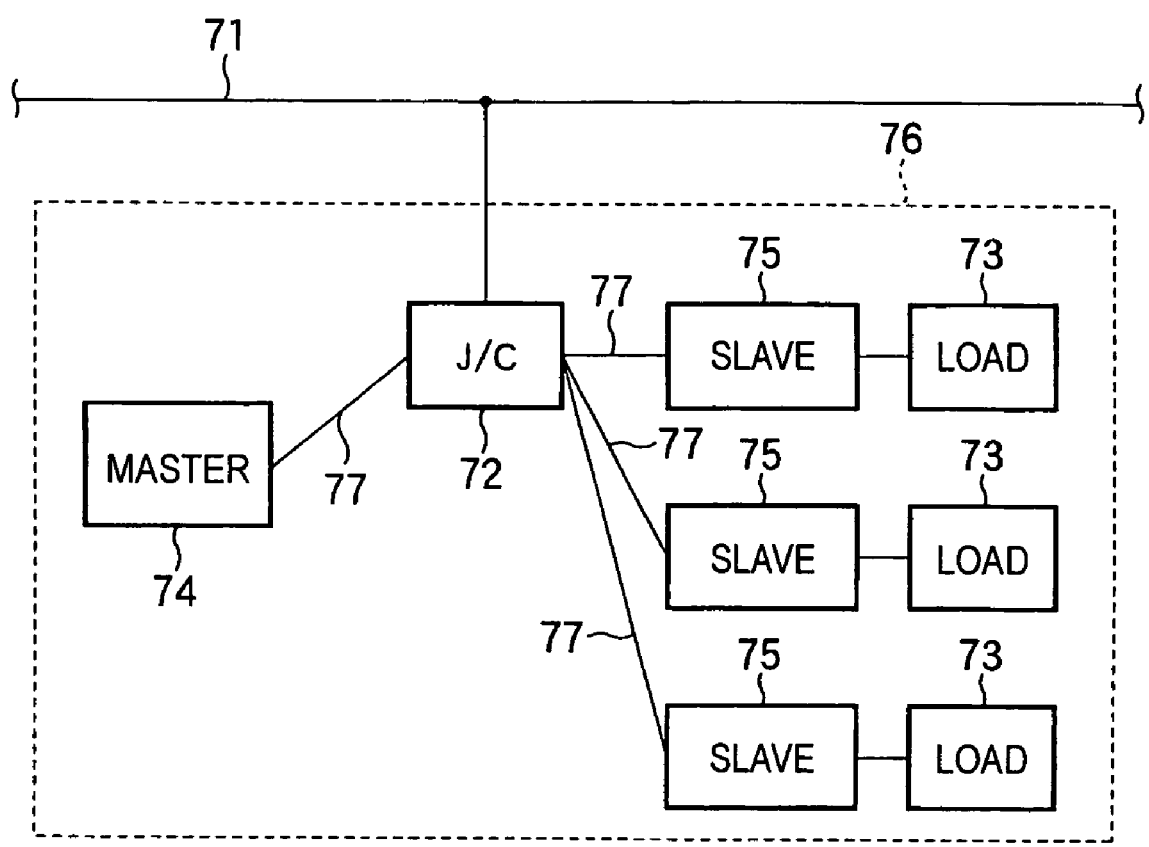
FIG. 3 is a conceptual illustration of a vehicle-mounted equipment control system having a single PLC network.
Figure 4:
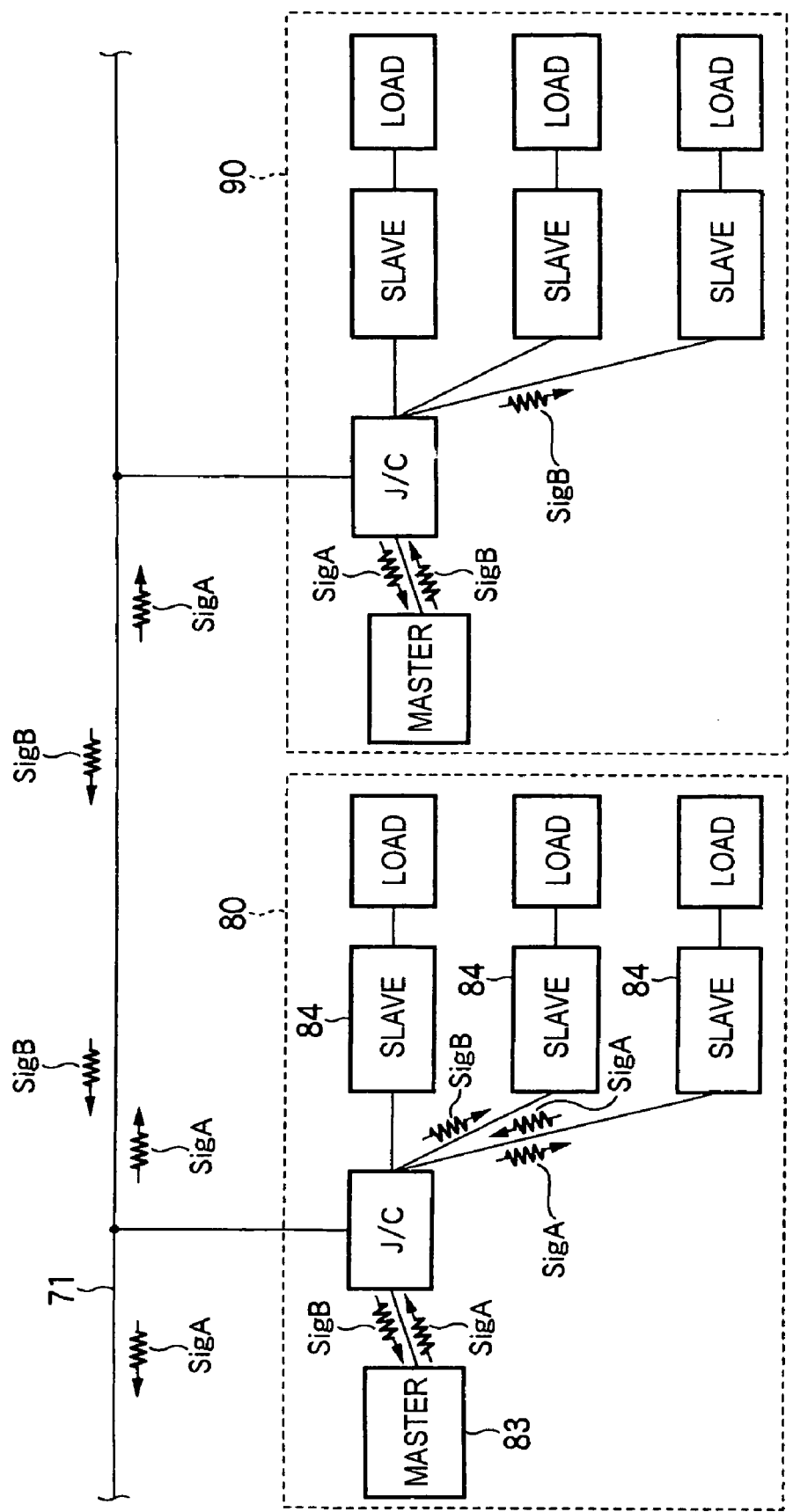
FIG. 4 is a conceptual illustration of a vehicle-mounted equipment control system in which interference between adjacent PLC networks is occurred.

While the inductor 53 for reserving impedance in the master 40 is used as an inductor for attenuating a signal in the above embodiments, an LC resonator circuit 46 may be used as an inductor for attenuating a signal (a circuit for reserving impedance) as shown in FIG. 2.

While power is fed to each slave 50 via the master 40 in the first and second embodiments, it is also possible to feed power to any one slave 50 and then to the master 40 and the remaining slaves 50 as well as use the inductor 53 in the one slave 50 as an inductor for attenuating a signal.

The invention is not limited to the embodiments but various changes or improvements of the invention are possible as required. The form, quantity, and location of each component in the foregoing embodiments are arbitrary and are not limited as long as the purpose of the invention is attained.

What is claimed is:

1. A communication system, comprising:
a main power line; and
a plurality of PLC networks connected to the main power line in common,
wherein at least one of the PLC networks includes a plurality of nodes;
wherein one node of the nodes in the PLC network is connected to the main power line;
wherein the other nodes are interconnected via a sub power line so as to receive power from the main power line through the one node; and
wherein the one node has an inductor that is connected to the main power line and the sub power line.

2. The communication system as set forth in claim 1, wherein a circuit for reserving impedance in the one node serves as the inductor.

3. The communication system as set forth in claim 1, wherein the other nodes are sub controllers that are respectively connected to loads; and
wherein the one node is a master controller that controls the loads through the sub controllers.

4. A PLC network, comprising:
a plurality of nodes,
wherein one node of the nodes is connected to a main power line, the main power line being connected to other PLC network in common;
wherein the other nodes are interconnected via a sub power line so as to receive power from the main power line through the one node; and
wherein the one node has an inductor that is connected to the main power line and the sub power line.

5. The PLC network as set forth in claim 4, wherein a circuit for reserving impedance in the one node serves as the inductor.

6. The PLC network as set forth in claim 4, wherein the other nodes are sub controllers that are respectively connected to loads; and
wherein the one node is a master controller that controls the loads through the sub controllers.

7. A PLC network, comprising:
a master node;
a first slave node controlled by the master node;
wherein the master node is connected between a main power line and a sub power line,
wherein the main power line is connected to another PLC network in common;
wherein the first slave node is connected to the sub power line and receives power from the main power line, through the master node, and via the sub power line; and
wherein the master node comprises an inductor that is connected between the main power line and the sub power line.

8. The PLC network as set forth in claim 7, wherein the inductor constitutes at least part of a circuit for reserving impedance in the master node.

9. The PLC network as set forth in claim 7, wherein the first slave node comprises a first sub controller that is connected to a first load; and
wherein the master node comprises a master controller that controls the first load through the first sub controller.

10. The PLC network as set forth in claim 9, further comprising:
a second slave node controlled by the master node,
wherein the second slave node is connected to the sub power line and receives power from the main power line, through the master node, and via the sub power line.

11. The PLC network as set forth in claim 10, wherein the second slave node comprises a second sub controller that is connected to a second load, and
wherein the master controller controls the second load through the second sub controller.

* * * * *